May 13, 1952   H. F. CLARKE   2,596,531
VIBRATION MEASURING DEVICE
Filed Dec. 9, 1949

WITNESSES:
Ralph Castel Smith
Henry Heyman

INVENTOR:
Howard F. Clarke
BY
Roland A. Anderson
Attorney

Patented May 13, 1952

2,596,531

UNITED STATES PATENT OFFICE 2,596,531

VIBRATION MEASURING DEVICE

Howard F. Clarke, Pullman, Wash., assignor to the United States of America as represented by the United States Atomic Energy Commission Application December 9, 1949, Serial No. 132,165

6 Claims. (Cl. 73—67)

The present application is in part a continuation of copending applications Serial No. 132,163 and 132,164 both filed December 9, 1949.

This invention relates to apparatus for measuring and indicating small displacements. More specifically, the invention relates to an electronic system for measuring and indicating visually the characteristics of motion of vibrating objects.

A number of prior art arrangements are available for indicating by electrical means the characteristics of motion of vibrating bodies. In many such systems, an electro-mechanical translating device is coupled to the vibrating body in order to translate the physical quantities of vibration into electrical quantities. Such translating devices generally are of the piezo-electric or magneto-inductive type. In either case, a direct physical connection is necessitated between the vibrating body and the vibration sensitive element of the translating device.

Other prior art devices utilize light beam reflection off the vibrating object and translate the light beam displacements into electrical quantities by photo-cells. Devices of this type are difficult in utilization due to the necessity of light shielding and elaborate apparatus placement.

It has been found that any form of direct physical coupling between the observed vibrating body and the translating element inherently creates a number of deleterious effects. Foremost among these is the loading effect on the vibrating body with resultant modification of its natural vibrating characteristics.

Another deleterious effect arises from the superposition of resonance characteristics of the coupling link between the translation element and the vibrating body on the vibration characteristics of the vibrating body per se. The electrical quantities derived under these conditions are not valid proportionalities to the motion of the observed body.

Other disadvantages are present in the prior art including adverse effects of vibration on the translating device. For instance, the piezo-electric translator is structurally delicate and if subjected to even momentarily excessive vibration amplitudes, it is likely to fracture and thus be rendered useless. In addition, this type of translator is subject to deterioration due to environmental effects, such as for example, temperature and humidity. The magneto-inductive translator is also subject to deterioration due to fatigue and the imposition of stresses beyond the design value.

It follows, therefore, that among the objects of the present invention, a principal object is to provide a vibration measuring device in which the only coupling between the device and the observed object is an electro-magnetic field, and in which improved accuracy is obtained in the measurement of small displacements.

Other objects, features and advantages will appear in the following detailed description of a preferred embodiment of the invention. It is to be understood that this embodiment is only an illustrative example of practice and that the invention comprehends such other embodiments as come within the scope and spirit of the appended claims.

In the accompanying drawing made a part of this specification:

Heretofore, in the referenced copending applications, vibration measuring devices have been shown in which micro-waves are injected into a wave guide, and emitted from an open end thereof to impinge upon the observed vibrating surface. Part of the impinging energy is reflected back into the wave guide so that either the amplitude of reflected energy or the amplitude and position of standing waves in the wave guide is a function of the instantaneous position of the observed surface.

In the present invention, a micro-wave guide section of the type known in the art as the magic tee or T-bridge is used. This wave guide section has four arms. Energy is injected into a first one of the arms and no energy is emitted from a second of the arms if the loads presented to the third and fourth arms are equal. It follows that if a vibrating body is supported in opposition to the energy path of the third arm and a load equal to the vibrating body in its mean position terminates the energy path of the fourth arm, that energy is emitted from the second arm corresponding to displacement of the vibrating body from its mean position. Energy emitted from the second arm has an instantaneous magnitude which is a function of the instantaneous position of the vibrating body.

Figure 1:
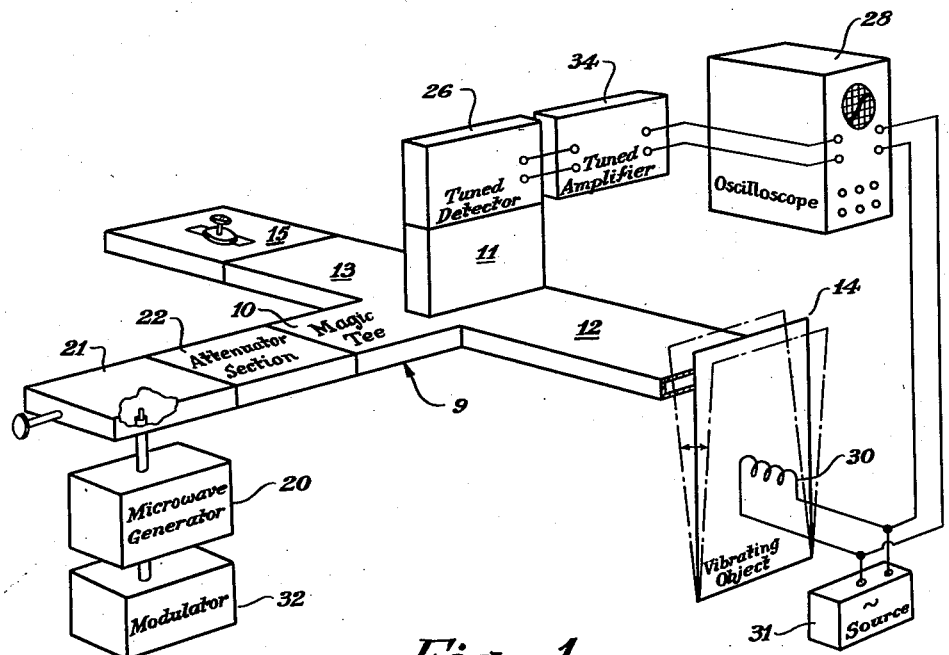
Figure 1 illustrates a practical embodiment in perspective partly in section of the invention.

Referring to Figure 1, a wave guide of the magic tee variety is indicated generally by the reference numeral 9. Energy is injected into the arm 10 and no energy is emitted from output arm 11 under the condition that the terminating impedances presented to arms 12 and 13 are equal.

The vibrating body 14 is supported in opposition to the energy path of wave guide arm 12 so that at least a portion of the energy impinging thereon is returned into the wave guide. The opposite wave guide arm 13 is terminated by a tuned section 15 which is adjusted to reflect an amount of energy equal to that reflected by the vibrating body in a selected position. Deviations in the position of the vibrating body from the selected position are translated into variations in energy emitted from arm 11.

The magic tee section is energized by a microwave generator 20 which is coupled thereto through a tuned coupling section 21 and an attenuator section 22. The attenuator section is for the purpose of preventing variations in reflected energy in the magic tee section from being reflected back to the micro-wave generator as a variable load impedance. The attenuator section, therefore, prevents variations in generator output frequency and amplitude due to variations in position of the vibrating body 14.

Variations in amplitude of the micro-wave energy traversing magic tee arm 11 as a result of excursions of vibrating body 14 are converted into unidirectional potentials by detector 26. The unidirectional potentials are impressed on an indicator which can be an oscilloscope as shown at 28.

It has been found to be expedient to excite the vibrating object and the oscilloscope horizontal sweep from a common source. This is accomplished as shown schematically by coil 30 energized by a source 31. The oscilloscope horizontal sweep is likewise energized by source 31 with the result that the instantaneous positions of the vibrating body are loci developing a single trace.

It has been found to be advantageous to energize the apparatus with wave energy of pulsed square wave form. The oscillator in the microwave generator 20 is preferably a klystron which is modulated half time on and half time off by a square wave generated by modulator 32. The square wave is inserted in series with the beam or reflector supply. The modulating energy is square wave rather than sine wave in order to prevent frequency modulation of the oscillator.

The wave guide detector is tuned and feeds into a tuned amplifier 34 which in turn ultimately feeds the vertical deflecting plates of the oscilloscope. The amplifier can be made very sensitive because it does not respond to spurious signals induced in the detector unless they are modulated at the modulation frequency.

Figure 2:
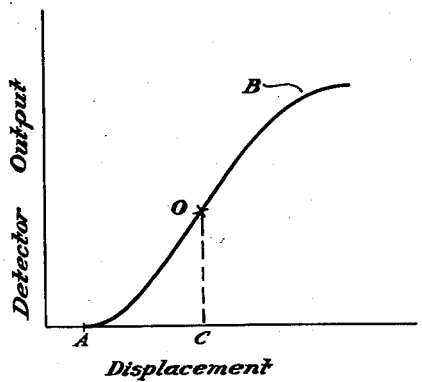
Figure 2 is a chart showing the relation between potential developed by the apparatus corresponding to displacement of the observed object.

The manner in which the apparatus is calibrated is explained with reference to Figure 2.

The observed body is first permitted to remain in its stationary unexcited position. The impedance 15 is tuned so that no energy passes to detector 28 and this establishes the point A on the curve of Figure 2. The observed body is next moved in measured increments toward or away from the mouth of the wave guide thereby determining the loci of all points of the curve B and the trace deflection values of the oscilloscope 28 are established. The point O is chosen as the center of symmetry and the observed body shifted in position so that in its stationary condition, it is positioned in a location corresponding to C on the abscissa of Figure 2. It follows that the observed object, if energized, vibrates from the mean position C so as to establish an approximately linear trace on the oscilloscope.

It is therefore seen that an apparatus has been described which is capable of indicating and measuring displacements of a vibrating body without mechanically interfering with the natural characteristics of the body.

Although the invention is described in the foregoing specification with reference to a preferred embodiment, other modifications are possible. Therefore, the invention is to be restricted only by the appended claims, as interpreted in view of the prior art.

What is claimed is:

1. In a device for measuring small displacements of an observed vibrating electric wave reflecting object, a magic tee wave guide having first, second, third and fourth arms, said second and third arms being collinear, said first arm being normal to the second and third arms and in the same plane thereof and said fourth arm being normal to the plane of the first, second and third arms, means for injecting electromagnetic wave energy in the first of said arms, said second arm free end being open, means supporting the wave guide with the axis of the second arm adapted to intercept the observed object and with the open end thereof spaced from and proximate to said object, means for terminating the third arm with a dummy load, and rectifier means coupled to the fourth arm whereby a unidirectional potential is generated corresponding to displacements of the observed object.

2. In a device for measuring small displacements of an observed vibratory object, a magic tee wave guide having first, second, third and fourth arms, said second and third arms being collinear, said first arm being normal to the second and third arms and in the same plane thereof and said fourth arm being normal to the plane of the first, second and third arms, means for injecting electromagnetic wave energy into said first arm, said second arm having an open end, means for supporting the wave guide second arm collinearly with and its open end proximate to the observed object, a rectifier coupled to the fourth arm and means for adjusting the impedance of the third arm so that no energy is impressed on the rectifier corresponding to a selected position of the observed object.

3. In a device for measuring vibrational displacement of an observed object, a magic tee wave guide, said wave guide having first, second, third and fourth arms, said second and third arms being collinear, said first arm being normal to the second and third arms and in the same plane thereof and said fourth arm being normal to the plane of the first, second and third arms, means for injecting electromagnetic wave energy into the first of said arms, said second arm having an open end, means for supporting the vibratory object exteriorly of the second arm on the axis and proximate the open end thereof, means for terminating the third arm so as to balance energy reflected into the second arm by the vibratory object in norm position, and rectifier means coupled to the fourth arm adapted to generate a potential corresponding to the instantaneous displacements of the observed object.

4. A displacement measuring device comprising a T-bridge wave guide having an energy inlet arm, a first and a second side outlet arm and a terminal outlet arm, said first side outlet arm being open at its free end, an electromagnetic wave energy source, an attenuator wave guide section coupling the energy source and the wave guide inlet arm, said T-bridge wave guide being adapted to be supported so that the energy path of the first of the side outlet arms intercepts an observed movable object, energy indicating means coupled to the terminal outlet arm and means for terminating the second side outlet arm with an impedance such that no energy is indicated by said indicating means for a selected position of said object.

5. A displacement measuring device comprising a T-bridge wave guide having an energy inlet arm, a first and a second side outlet arm and a terminal outlet arm, said first side outlet arm being open at its free end, a source of electromagnetic wave energy pulses, an attenuator wave guide section coupling the wave energy source and the wave guide inlet arm, said T-bridge wave guide being adapted to be supported so that the energy path of the first of the side outlet arms intercepts a moving object, a wave energy rectifier coupled to the terminal outlet arm and means for terminating the second side outlet arm with an impedance such that no potential is developed by said rectifier for a selected position of said object, an amplifier tuned to the frequency of occurrence of the wave energy pulses coupled to the rectifier, and an oscilloscope coupled to the amplifier.

6. A displacement measuring device comprising a magic tee electromagnetic wave guide having an energy inlet arm, a first and a second side outlet arm and a terminal outlet arm, said first side outlet arm being open at its free end, a source of electromagnetic wave energy pulses, an attenuator wave guide section coupling the energy source and the wave guide inlet arm, said magic tee wave guide being adapted to be supported so that the energy path of the first of the side outlet arms intercepts an observed vibratory object, energy rectifier means coupled to the terminal outlet arm and means for terminating the second side outlet arm with an impedance such that no potential is developed by said rectifier means for a selected position of said object; an oscilloscope, an amplifier tuned to the frequency of occurrence of the wave energy pulses coupling the oscilloscope vertical deflection terminals to the rectifier means, a source of alternating current, motor means connected to said source of alternating current for vibrating the observed body and means for coupling the alternating current source to the oscilloscope horizontal deflection terminals to thereby obtain a synchronized trace.

HOWARD F. CLARKE.

REFERENCES CITED

The following references are of record in the file of this patent:

UNITED STATES PATENTS

| Number | Name | Date |
| --- | --- | --- |
| 1,743,414 | Wente | Jan. 14, 1930 |
| 2,043,984 | Alder | June 16, 1936 |
| 2,403,289 | Korman | July 2, 1946 |
| 2,482,173 | Hagstrum | Sept. 20, 1949 |
| 2,498,548 | Howard | Feb. 21, 1950 |